March 17, 1970 — J. J. CALLAHAN ET AL — 3,500,958
FLOW RESPONSIVE VALVE FOR LUBRICATING SYSTEMS
Filed Nov. 16, 1967 — 2 Sheets-Sheet 1

INVENTORS
JAMES J. CALLAHAN
RALPH F. URSO
JOHN P. SNOW

BY Whittemore, Hulbert & Belknap
ATTORNEYS

March 17, 1970   J. J. CALLAHAN ET AL   3,500,958
FLOW RESPONSIVE VALVE FOR LUBRICATING SYSTEMS
Filed Nov. 16, 1967   2 Sheets-Sheet 2

INVENTORS
JAMES J. CALLAHAN
RALPH F. URSO
JOHN P. SNOW

BY Whittemore, Hulbert
  + Belknap
  ATTORNEYS

United States Patent Office 3,500,958
Patented Mar. 17, 1970

3,500,958
FLOW RESPONSIVE VALVE FOR LUBRICATING SYSTEMS
James J. Callahan, Bloomfield Hills, Ralph F. Urso, Grosse Pointe Farms, and John P. Snow, Royal Oak, Mich., assignors to McCord Corporation, Detroit, Mich., a corporation of Maine
Filed Nov. 16, 1967, Ser. No. 683,712
Int. Cl. F16n 29/04
U.S. Cl. 184—6                                           6 Claims

ABSTRACT OF THE DISCLOSURE

A valve for use in lubricating systems to sense lubricant flow failure and actuate electrical or pneumatic means for giving a warning signal or shutting down operation of an engine or other machine in the event of failure of lubricant flow to the machine. A valve body is connected into a lubricant flow line and includes a reciprocable piston having one end exposed to inlet pressure and movable against a spring in response to lubricant flow through the line to open an outlet passage in the valve body to allow flow through the valve and lubricant line. A passage transmits the lower outlet pressure to the other end of the piston, and the pressure drop from the inlet to the outlet is balanced by the spring. When lubricant flow ceases, the spring moves the piston to close the outlet and at the end of such movement the piston closes an electrical warning or control circuit. In a modification, the piston actuates a pneumatic valve which performs a control function in the event of failure of lubricant flow.

---

Engines and other machines are frequently equipped with automatic lubricating systems including a pump and a series of lubricant divider valves to cyclically discharge measured quantities of lubricant to various points to be lubricated. In the event of a failure of lubricant flow for any reason it is necessary to either signal this condition or to automatically shut down the engine or other machine being lubricated. The present invention provides a flow sensing valve which is installed in a lubricant flow line and which will actuate a warning signal or control means in the event of a failure of lubricant flow in the lubricating system.

According to the present invention, a valve body having an inlet and an outlet is connected into a lubricant flow line and is provided with a reciprocable piston having one end exposed to the lubricant flowing through the inlet in the valve body. The piston is biased by a spring to a position in which it closes the outlet passage but is movable against the spring to open the outlet passage when lubricant flows through the line. The pressure existing at the outlet passage is transmitted to the other end of the piston, and the pressure drop between the inlet and outlet passages provides an unbalance of pressure of opposite ends of the piston which is equal to the spring value of the bias spring. When a failure of lubricant flow occurs, the spring moves the piston in a direction to close the outlet passage, and at the end of its travel the piston actuates a control device for the engine being lubricated or energizes a warning device. In one form of the invention the piston is adapted to close an electrical circuit which may be used to ground a magneto or to shut down operation of a fuel valve in an engine or to perform any other required function. In another form of the invention the piston mechanically actuates a pneumatic valve device which in turn performs a control function over the engine being lubricated.

Figures 1, 2:
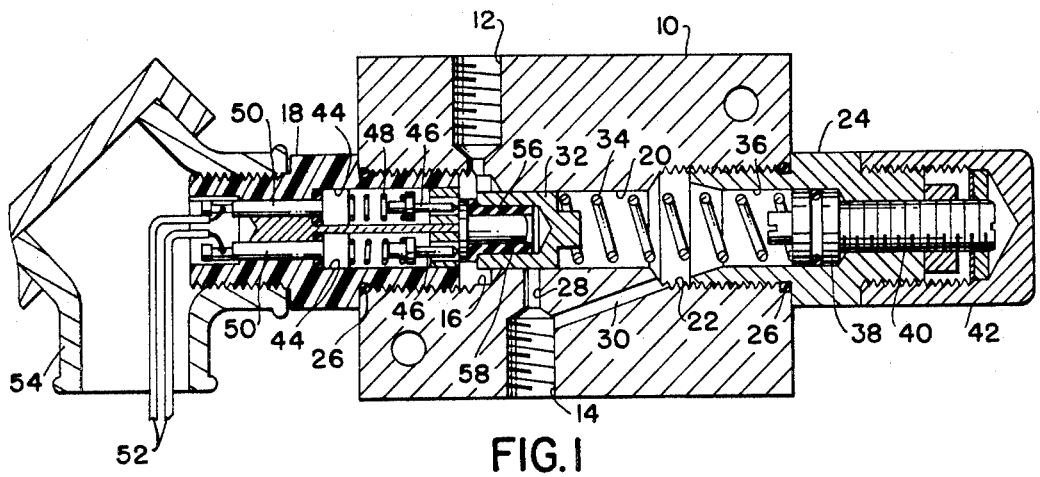
FIGURE 1 is a sectional view through a valve of the type described which is adapted to close an electrical circuit upon failure of lubricant flow through the valve.
FIGURE 2 is a sectional view taken on line 2—2 of FIGURE 3, showing a modified form of the invention in which the piston is adapted to actuate a pneumatic valve to perform a control function upon failure of lubricant flow.

In the form of the invention shown in FIGURE 1 a valve body 10 is provided with an inlet passage 12 and an outlet passage 14 which are adapted to be connected into a lubricant flow line in a lubricating system (not shown) in which a pump supplies lubricant under pressure through the lubricant line to a lubricant metering block which automatically supplies measured quantities of lubricant to various points to be lubricated in an engine or other machine. The valve body 10 is provided with a chamber 16 into which lubricant under pressure is delivered through the inlet 12. The chamber 16 is threaded to receive a plug 18 which contains a pair of electrical contacts forming a part of an electrical circuit, as will be more fully described hereinafter.

The valve body 10 is provided with a bore 20 communicating with the chamber 16 at one end and at its other end opening into a chamber 22 which is threaded to receive a plug 24. O-ring seals 26 are provided between the plugs 18 and 24 and the valve body 10. A passage 28 leading from the outlet 14 opens into the bore 20 between the ends of the bore, and a passage 30 provides communication between the outlet 14 and the chamber 22.

A piston 32 is reciprocable within the bore 20 and is urged by a spring 34 toward the chamber 16. The spring 34 extends into a recess 36 in the plug 24 and engages the head 38 of an adjusting screw 40 which may be turned to adjust the force of the spring 34. A cap 42 is threadedly received on the outer end of the plug 24 to enclose the outer end of the adjusting screw 40.

When lubricant under pressure is supplied through the inlet 12 in to chamber 16, the pressure exerted against the left-hand end of the piston 32 will shift the piston against spring 34 toward the chamber 22 until the passage 28 leading to the outlet 14 is opened, thereby permitting lubricant flow through the valve body 10 and on through the lubricant line to the lubricant metering valve. The passage 30 transmits the pressure existing in the outlet 14 to the opposite end of the piston 32, but such pressure will be lower than the pressure existing in the inlet 12 and chamber 16 due to the pressure drop between the inlet 12 and the outlet 14. The unbalance of pressure on opposite ends of the piston 32 is equal to the value of the bias spring 34 which spring value may be adjusted by the adjusting screw 40. As long as lubricant flows through the supply line, the piston 32 will remain in its right-hand position in which passage 28 is open.

The plug 18 includes a pair of recesses 44, each containing an electrical contact 46 urged by a spring 48 outwardly of the recess 44 toward the chamber 16. The springs 48 engage electrically conductive pins 50, each of which is electrically connected to a wire 52 leading from the valve unit through a housing 54. The wires 52 are connected into an electrical circuit (not shown) which when energized may give a warning signal or perform some control function over the engine being lubricated to shut down the engine in the event of lubricant flow failure. The contacts 46 are electrically connected to the wires 52 through the pins 50 and springs 48.

The left-hand end of piston 32 is provided with a recess containing an insulating bushing 56 which carries an electrical contact member 58. When the piston 32 is in its left-hand position the contact member 58 engages the contacts 46, thereby closing the electrical warning or control circuit.

The piston 32 will remain in its right-hand position as long as lubricant flows through the valve. The piston 32 has a close fit within bore 20, but does not sealingly engage the bore, thereby allowing lubricant to slip past the piston 32 when the piston moves back toward the chamber 16. In the event of failure of lubricant flow, the spring 34 will shift the piston 32 through the bore 20 thereby closing outlet passage 28. Continued movement of the piston 32 under the influence of spring 34 will effect engagement between the contact member 58 and contacts 46, thereby energizing the electrical control circuit. Such movement of piston 32 is permitted by the dashpot fit of the piston 32 within the bore 20 and takes place at a rather slow rate which may be determined by the setting of the adjustment screw 40. For purposes of illustration only, the fit of the piston 32 within the bore 20 and the setting of the adjusting screw 40 may be such that approximately one minute is required for the piston 32 to complete its movement into engagement with the contacts 46 after the failure of lubricant flow occurs. The dashpot effect of the piston 32 prevents immediate shifting of the piston 32 to close the electrical circuit in the event that momentary flow failures occur in normal operation of the lubricating system. However, the valving device will positively energize the electrical circuit in the event of prolonged failure of lubricant flow through the system.

Figure 3:
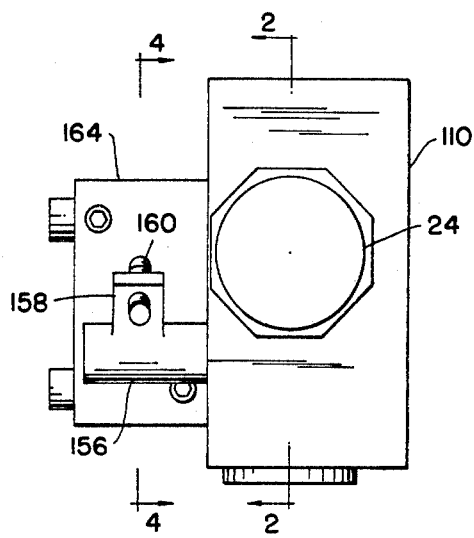
FIGURE 3 is an end elevational view of the valve shown in FIGURE 2.
Figure 4:
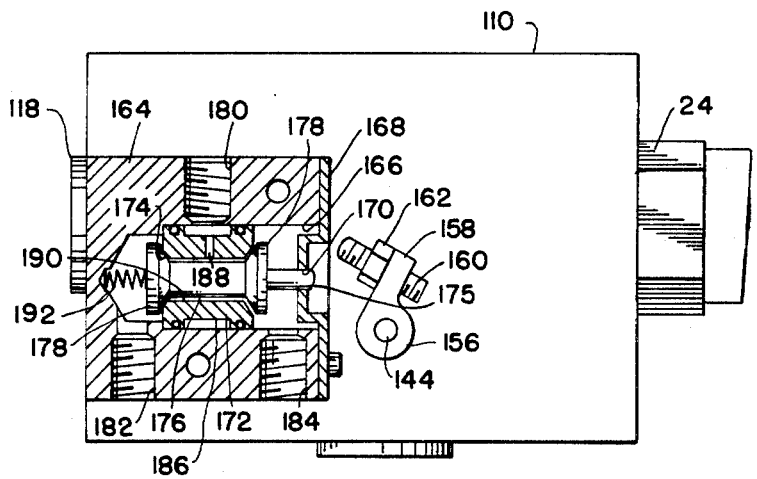
FIGURE 4 is a sectional view taken on line 4—4 of FIGURE 3.

In the form of the invention shown in FIGURES 2, 3 and 4, the valve body 110 is provided with an inlet 112 and an outlet 114, a chamber 116 and a chamber 122 connected by a bore 120, and a plug 24 containing an adjusting screw 40 threaded into the chamber 122. A plug 118 closes the chamber 116. The passage 130 extends between the outlet passage 114 and the chamber 122, and the passage 128 leads from bore 120 to the outlet passage 114.

The piston 132 is reciprocable within bore 120 and is urged by spring 134 toward the chamber 116. The valve body 110 is provided with an opening 140 intersecting the bore 120 and closed by a plug 142. A shaft 144 has its opposite ends journaled in the body 110 and extends through the opening 140 in spaced transverse relation to the piston 132. A sleeve 146 is secured on the shaft 144 within the opening 140 by a pin 148. An arm 150 has one end secured within a socket in the sleeve 146 and extends through the opening 140 into a transverse bore 152 in the piston 132. The upper end of the arm 150 is secured within a socket formed in a ball 154 located within the transverse bore 152. Reciprocation of piston 132 will therefore rotate the shaft 144 about its axis.

A collar 156 is secured on the shaft 144 exteriorly of the valve body 110 and has an integral arm 158 extending therefrom. A pin 160 is threaded into an opening in the arm 158 and is retained in an adjusted position therein by a nut 162.

A valve block 164 is mounted on the valve body 110 and is provided with a chamber 166 opening from one wall thereof which is provided with a cover plate 168 having an opening 170 therein. A valve seat member 172 is located within the valve block 164 and is formed to provide outwardly facing valve seats 174 at its opposite ends. A poppet valve member 176 has enlarged valve portions 178 at its opposite ends engageable with their respective valve seats 174 and a stem 175 extending through opening 170 in plate 168.

The valve block 164 is provided with ports 180, 182, and 184 opening into the chamber 166 formed in the valve block 164. The passage 180 opens into the chamber 166 opposite a reduced diameter portion 186 of the valve seat member 172 with the latter being provided with a diametral passage 188 extending from the reduced portion thereof to the central bore 190 through the member 172. A spring 192 is confined between the inner end of the chamber 166 and one end of the poppet valve member 176 so as to normally close the communication between the port 180 and the port 182 while allowing communication between the port 180 and the port 184 through the valve seat member 172.

The piston 132 will move against spring 134 to open the outlet passage 128 when lubricant under pressure is supplied through the lubricant line to the inlet 112 and chamber 116. As long as lubricant flow continues, the piston 132 will remain in such position. When lubricant flow ceases, the spring 134 will shift the piston 132 back toward chamber 116, thereby rotating the shaft 144 through the arm 150 in a direction to swing the pin 160 carried by the cam member 156 into engagement with the end 175 of the poppet valve member 176 to shift the latter against the spring 192 to close the communication between ports 180 and 184 and open the communication between ports 180 and 182. The shifting of the poppet valve member 176 is thus suitable for performing a control function over the engine or machine being lubricated in a variety of ways. For example, in gas engines employing a fuel valve which is maintained in an open position during normal running of the engine by a pressure fluid, such pressure fluid can be supplied to one of the ports in the valve block 164, for example the port 180, port 184 may be plugged, and port 182 connected to exhaust. As long as the poppet valve member 176 remains in its right-hand position, pressure will be maintained in the system to keep the fuel valve operating properly for normal engine operation. As soon as lubricant flow failure occurs, the piston 132 will shift at a controlled rate determined by the fit of the piston within the bore 120 and the force exerted by spring 134 until the pin 160 engages the poppet valve member 176 to open the communication between ports 182 and 180, thereby bleeding off the pressure in the fuel system to exhaust and causing the fuel valve to shut down and stop the engine. The pneumatic control valve described may be used to perform any other suitable control function over the machine being lubricated. As described in connection with the modification shown in FIGURE 1, the fit of the piston 132 within the bore 120 allows small quantities of oil to flow past the piston from the chamber 116 to the chamber 122, thereby damping the return movement of the piston 132 to prevent actuation of the pneumatic control valve in the event of pulsations in the lubricant supply line or momentary stoppages of lubricant flow through the supply line.

What we claim as our invention is:

1. In a lubricating system for supplying lubricant under pressure to a machine to be lubricated and including a lubricant flow line, a lubricant fluid flow sensing valve adapted to be connected into said lubricant flow line comprising a valve body having a chamber therein, an inlet passage opening into said chamber, a bore communicating with said chamber, an outlet passage leading from said bore and passage means between said outlet passage and the end of said bore remote from said chamber, a piston reciprocable in said bore between said chamber and said remote end of said bore so that one end of said piston is always exposed to the pressure in said passage means, said piston adapted to open and close said outlet passage upon reciprocation thereof, spring means urging said piston toward said chamber to a position in which said piston closes said outlet passage, said piston having the other end thereof exposed to said chamber whereby lubricant flow through said inlet passage into said chamber moves said piston against said spring means to open said outlet passage, said piston having a dashpot fit within said bore whereby upon cessation of flow through said inlet passage said spring means is effective to shift said piston toward said chamber while lubricant slips past said piston to effect movement of said piston at a controlled rate, and control means cooperable with said piston and actuated in response to movement of said piston by said spring means to signal said lubricant flow failure.

2. A valve according to claim 1 including adjustable means for said spring means for adjusting the force exerted by said spring means against said piston.

3. A valve according to claim 1 wherein said control means comprises a pair of electrical contacts in said chamber and forming part of an electrical control circuit for the machine to be lubricated, and a contact member mounted on said one end of said piston and adapted to engage said pair of contacts to close said circuit when said piston reaches the end of its movement under the influence of said spring means.

4. A valve according to claim 1 wherein said control means comprises a pneumatic valve mounted on said valve body and including a movable valve member, an actuating member engageable with said movable valve member, and a motion transmitting connection between said piston and said actuating member for causing the latter to shift said valve member when said piston reaches the end of its movement under the influence of said spring means.

5. A valve according to claim 4 wherein said motion transmitting connection comprises a rotatable shaft on which said actuating member is mounted, and an arm extending from said shaft into said bore and engaged with said piston for rotating said shaft upon movement of said piston.

6. A lubricant flow sensing device for lubricating systems comprising a valve body having a chamber therein, an inlet passage opening into said chamber, a bore communicating with said chamber, an outlet passage leading from said bore and passage means between said outlet passage and the end of said bore remote from said chamber, said inlet and outlet passages adapted to be connected into a lubricant flow line, a piston reciprocable in said bore between said chamber and said remote end of said bore so that one end of said piston is always exposed to the pressure in said passage means, said piston adapted to open and close said outlet passage upon reciprocation thereof, spring means urging said piston toward said chamber to a position in which said piston closes said outlet passage, said piston having the other end thereof exposed to said chamber whereby lubricant flow through said inlet passage into said chamber moves said piston against said spring means to open said outlet passage as long as said lubricant flow continues, said spring means, upon cessation of flow through said inlet passage, being effective to shift said piston toward said chamber while lubricant slips past said piston to effect movement of said piston at a controlled rate, and control means adapted to be actuated in response to movement of said piston by said spring means to signal said lubricant flow failure.

References Cited
UNITED STATES PATENTS

| | | |
|---|---|---|
| 1,025,222 | 5/1912 | Wallace. |
| 1,274,228 | 7/1918 | Zagora. |
| 1,339,798 | 5/1920 | Thompson _____ 184—6 XR |
| 1,665,366 | 4/1928 | Jehle _____ 184—6 |
| 2,138,969 | 12/1938 | Hobbs _____ 184—6 |
| 2,298,646 | 10/1942 | Ovens _____ 184—6 |
| 3,148,671 | 9/1964 | Bottorff et al. ____ 137—87 XR |
| 3,358,790 | 12/1967 | Krudewig _____ 184—6 |

FRED C. MATTERN, Jr., Primary Examiner

M. A. ANTONAKAS, Assistant Examiner

U.S. Cl. X.R.

137—87